United States Patent
Tsai

(10) Patent No.: US 7,184,278 B2
(45) Date of Patent: Feb. 27, 2007

(54) ELECTRONIC APPARATUS AND SHIELDING STRUCTURE FOR HEAT DISSIPATION OPENINGS

(75) Inventor: Chih Sheng Tsai, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 68 days.

(21) Appl. No.: 11/159,319

(22) Filed: Jun. 23, 2005

(65) Prior Publication Data

US 2005/0286241 A1    Dec. 29, 2005

(30) Foreign Application Priority Data

Jun. 23, 2004    (TW)    ............... 93118168 A

(51) Int. Cl.
*H05K 9/00*    (2006.01)
(52) U.S. Cl. .................. 361/816; 361/807; 361/818; 361/752
(58) Field of Classification Search ................ 361/752, 361/790, 797, 800, 818, 816, 801–802, 810, 361/807; 174/138
See application file for complete search history.

(56) References Cited

U.S. PATENT DOCUMENTS 4,713,714 A * 12/1987 Gatti et al. ................. 360/137
5,671,198 A * 9/1997 Tsuchiya et al. ......... 369/30.32
6,005,768 A * 12/1999 Jo ............................. 361/685

FOREIGN PATENT DOCUMENTS

JP    2000-56861 A    2/2000

* cited by examiner

*Primary Examiner*—Tuan Dinh
*Assistant Examiner*—Hung S. Bui
(74) *Attorney, Agent, or Firm*—Birch, Stewart, Kolasch & Birch, LLP

(57) ABSTRACT

An electrical apparatus includes a housing, a shielding plate, a first elastic element, and a second elastic element. In this case, the housing has at least one heat dissipation opening. The shielding plate has at least one first hole, a first sidewall and a second sidewall. The shielding plate is disposed parallel to at least one part of the housing. When the shielding plate is moved, the first hole and the heat dissipation opening are aligned. At least one part of the first elastic element contacts the first sidewall. The first elastic element is made of a shape memory alloy. At least one part of the second elastic element contacts the second sidewall. The shielding plate is movable between the first elastic element and the second elastic element.

16 Claims, 4 Drawing Sheets

ELECTRONIC APPARATUS AND SHIELDING STRUCTURE FOR HEAT DISSIPATION OPENINGS

BACKGROUND OF THE INVENTION

1. Field of Invention

The invention relates to an electrical apparatus and a shielding structure for a heat dissipation opening, and more particularly to an electrical apparatus having a shielding plate for shielding a heat dissipation opening when the electrical apparatus is not used and its shielding structure for the heat dissipation opening.

2. Related Art

Notebook computers have been widely used among the current information products because they have the main advantages of good mobility and capable of being carried by the user to anywhere according to user's requirements. In the highly developed and advanced information technology, a notebook computer may serve as a mobile workstation capable of obtaining and transferring the network information, the database management, and the likes. Thus, the notebook computer is the best choice for implementing the mobile office.

Electrical components that are closely integrated in a computer housing have been reduced in size in the notebook computer. When the notebook computer is being used, the electrical components tend to generate heat, which causes the temperature in the housing to rise. The portion that tends to generate heat in the notebook computer is generally close to the hard disk drive, the CPU and the power supply at the backside of the notebook computer. Typically, in a short-time usage, the heat dissipation does not constitute a problem. However, when the notebook computer is used for a long-time at a fixed location, the temperature may be too high, thereby deteriorating the qualities of the electrical components.

As shown in FIG. 1, in order to improve the heat dissipation effect of a notebook computer 1, the prior art provides a plurality of heat dissipation openings 12 on a backside of a housing 11 of the notebook computer 1 such that the cooling fan in the housing 11 can exchange the hot air for the cooling air. This brings the heat out via the heat dissipation openings 12 so as to reduce the temperature in the housing 11.

However, the efficiency of the electrical components in the housing 11 of the conventional notebook computer 1 tends to be decreased because particles or dust may fall into the heat dissipation openings 12, which are through holes.

It is therefore an important subjective of the invention to provide an electrical apparatus and a shielding structure for heat dissipation openings for solving the above-mentioned problems.

SUMMARY OF THE INVENTION

In view of the foregoing, the invention provides a shielding structure for heat dissipation openings that automatically opens or closes with the temperature rise or decrease in a housing, and an electrical apparatus with the shielding structure.

To achieve the above, an electrical apparatus of the invention includes a housing, a shielding plate, a first elastic element and a second elastic element. The housing has at least one heat dissipation opening. The shielding plate has at least one first hole, a first sidewall and a second sidewall. The shielding plate is disposed parallel to at least one part of the housing. The first hole and the heat dissipation opening are aligned when the shielding plate is moved. At least one part of the first elastic element contacts the first sidewall. The first elastic element is made of a shape memory alloy. At least one part of the second elastic element contacts the second sidewall. The shielding plate is movable between the first elastic element and the second elastic element.

To achieve the above, a shielding structure for shielding the heat dissipation opening of a housing is disclosed. The shielding structure includes a shielding plate, a first elastic element and a second elastic element. The shielding plate has at least one first hole, a first sidewall and a second sidewall. The shielding plate is disposed parallel to at least one part of the housing. When the shielding plate is moved, the first hole and the heat dissipation opening are aligned. At least one part of the first elastic element contacts the first sidewall, and the first elastic element is made of a shape memory alloy. At least one part of the second elastic element contacts the second sidewall. The shielding plate is movable between the first elastic element and the second elastic element.

As mentioned above, the electrical apparatus of the invention and its shielding structure for heat dissipation openings have a shielding plate, which is movable between the first elastic element and the second elastic element. The first elastic element and the second elastic element push the shielding plate to make the first hole on the shielding plate corresponding to the heat dissipation opening. Compared to the prior art, the electrical apparatus and the shielding structure can use the first elastic element, which is made of the shape memory alloy, to exert a force on the shielding plate to align the heat dissipation opening with the first hole. Accordingly, the air in the housing can be exchanged for the external cooling air when the temperature inside the housing rises. When the temperature in the housing decreases (e.g., when the electrical apparatus is not used), the second elastic element exerts a force on the shielding plate such that the heat dissipation opening and the first hole are misaligned, and the heat dissipation opening is closed. Therefore, when the electrical apparatus is not used, particles or dust may be free from entering the housing via the heat dissipation opening. Thus, the quality of the electrical apparatus is free from being influenced, and the good heat dissipation efficiency of the electrical apparatus may be ensured.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

An electrical apparatus according to the preferred embodiment of the invention will be described with reference to FIGS. 2 to 5.

The electrical apparatus of the invention includes a notebook computer, a personal digital assistant (PDA), and the likes. In this embodiment, the notebook computer serving as the electrical apparatus according to the preferred embodiment of the invention will be described.

Figure 1:
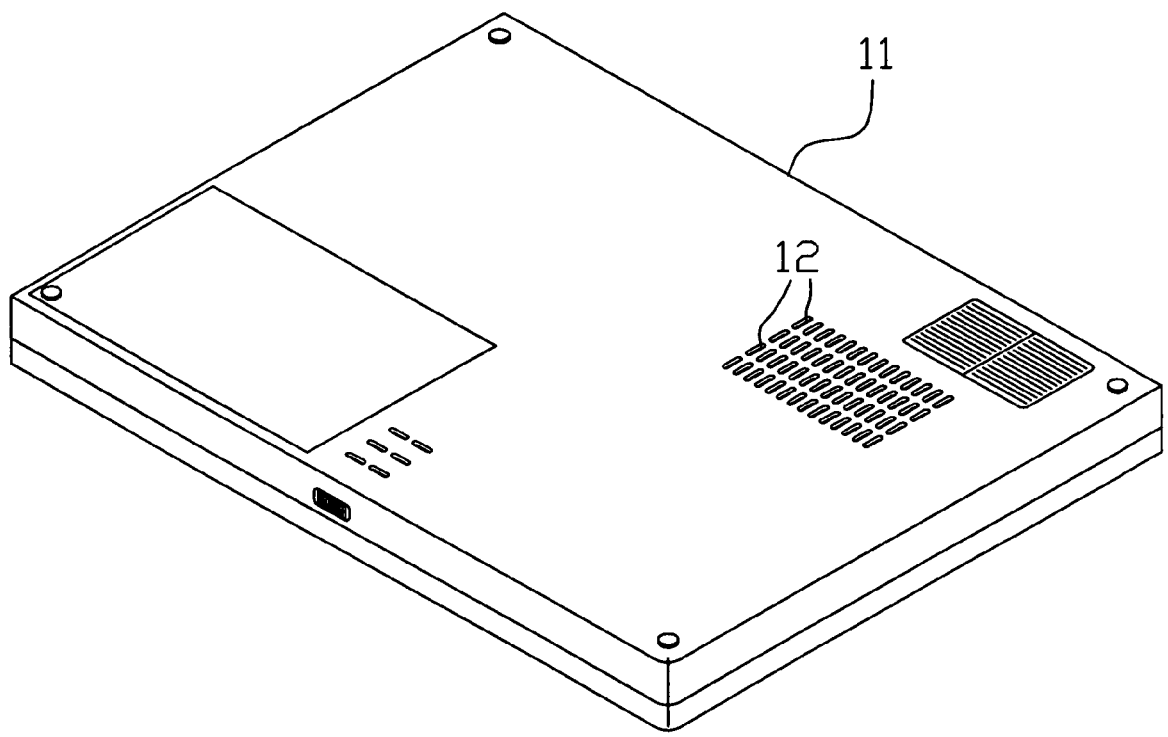
FIG. 1 is a schematic illustration showing a conventional notebook computer and its heat dissipation openings.
Figure 2:
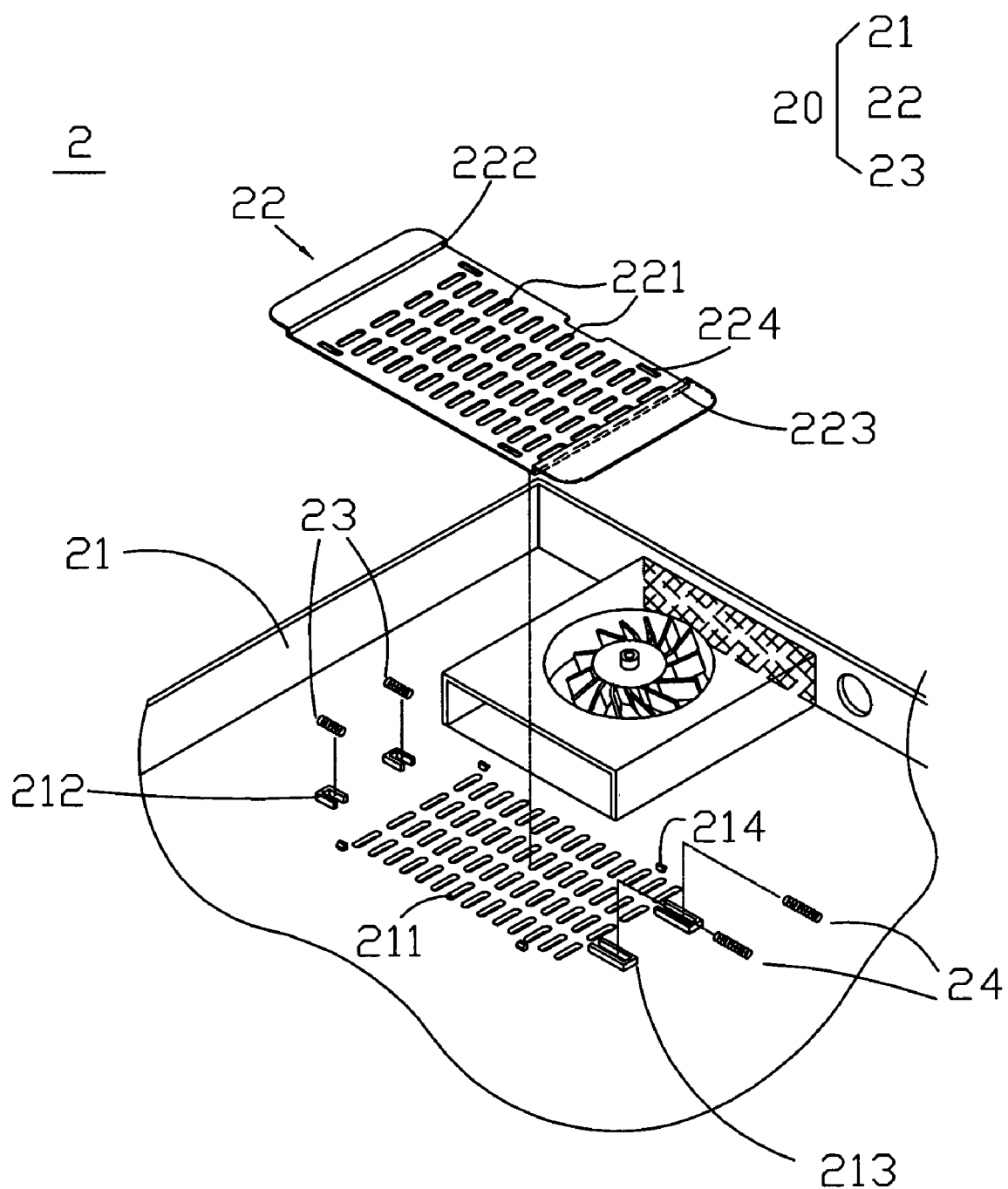
FIG. 2 is a partially schematic illustration showing an electrical apparatus and a shielding structure for heat dissipation openings according to a preferred embodiment of the invention.

As shown in FIG. 2, an electrical apparatus 2 includes a housing 21, a shielding plate 22, a first elastic element 23 and a second elastic element 24.

The housing 21 has at least one heat dissipation opening 211. In this embodiment, the housing 21 is a host housing for the electrical apparatus 2 and is formed with a plurality of heat dissipation openings 211. In addition, with reference to FIGS. 2 and 3, the housing 21 may further have at least one electrical element 25 and a cooling fan 26. The operation of the cooling fan 26 brings the generated heat of the electrical element 25 away from the housing 21 to reduce the temperature of the electrical element 25 by the cooling air entering the heat dissipation openings 211.

Referring to FIG. 2 again, in this embodiment, the housing 21 further has a first groove 212 and a second groove 213. The first elastic element 23 is accommodated in the first groove 212, and the second elastic element 24 is accommodated in the second groove 213. At least one part of the first elastic element 23 or the second elastic element 24 contacts the housing 21.

The shielding plate 22 has at least one first hole 221, a first sidewall 222 and a second sidewall 223. The shielding plate 22 is disposed parallel to at least one part of the housing 21.

With reference to FIG. 2, the shielding plate 22 further has at least one second hole 224, and the housing 21 further has at least one constraining member 214 penetrating through the second hole 224. In this embodiment, the constraining member 214 is a hook, which can pass through the second hole 224 and hook the shielding plate 22 to prevent the shielding plate 22 from falling when the electrical apparatus 2 is moved.

Figure 3:
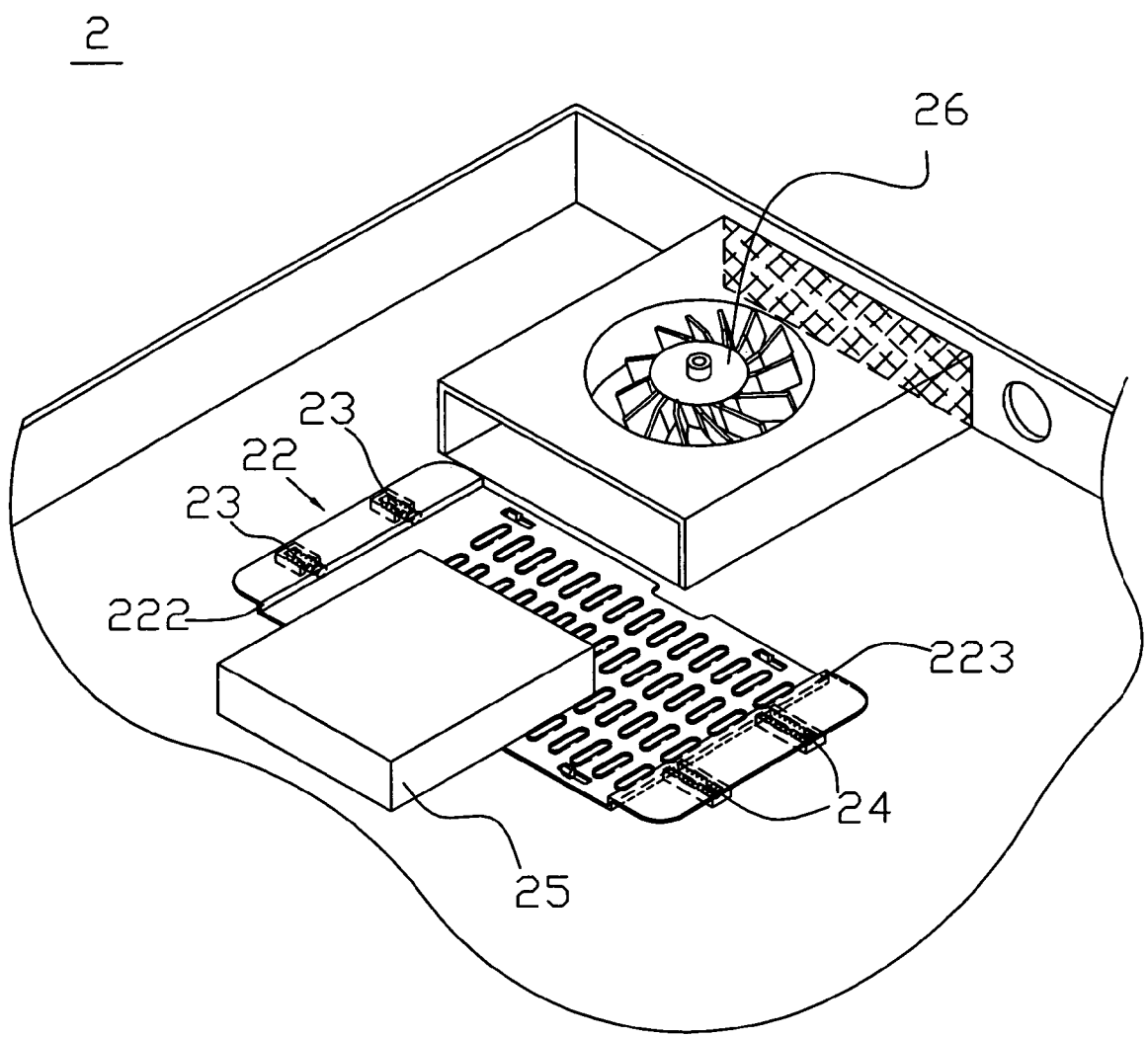
FIG. 3 is another partially schematic illustration showing the electrical apparatus and the shielding structure for the heat dissipation openings according to a preferred embodiment of the invention.

Referring to FIG. 3, at least one part of the first elastic element 23 contacts the first sidewall 222, and the first elastic element 23 is made of a shape memory alloy, which is, for example, a shape memory alloy.

In this case, the material of the shape memory alloy of the first elastic element 23 may be the Cu—Zn alloy, Cu—Al—Mn alloy, Cu—Al—Ni alloy, Cu—Al—Be alloy, Cu—Al—Be—Zr alloy or Cu—Al—Ni—Be alloy. In this embodiment, the material of the first elastic element 23 is the Ni—Ti alloy as an example.

As shown in FIG. 3, the second elastic element 24 has at least one part in contact with the second sidewall 223. In this embodiment, the second elastic element 24 is a compression spring.

As shown in FIGS. 2 and 3, with pushing the first sidewall 222 and the second sidewall 223 by the first elastic element 23 and the second elastic element 24, the shielding plate 22 is caused to move between the first elastic element 23 and the second elastic element 24. Thus, the alignment and misalignment of the heat dissipation opening 211 and the first hole 221 can be controlled.

Figure 5:
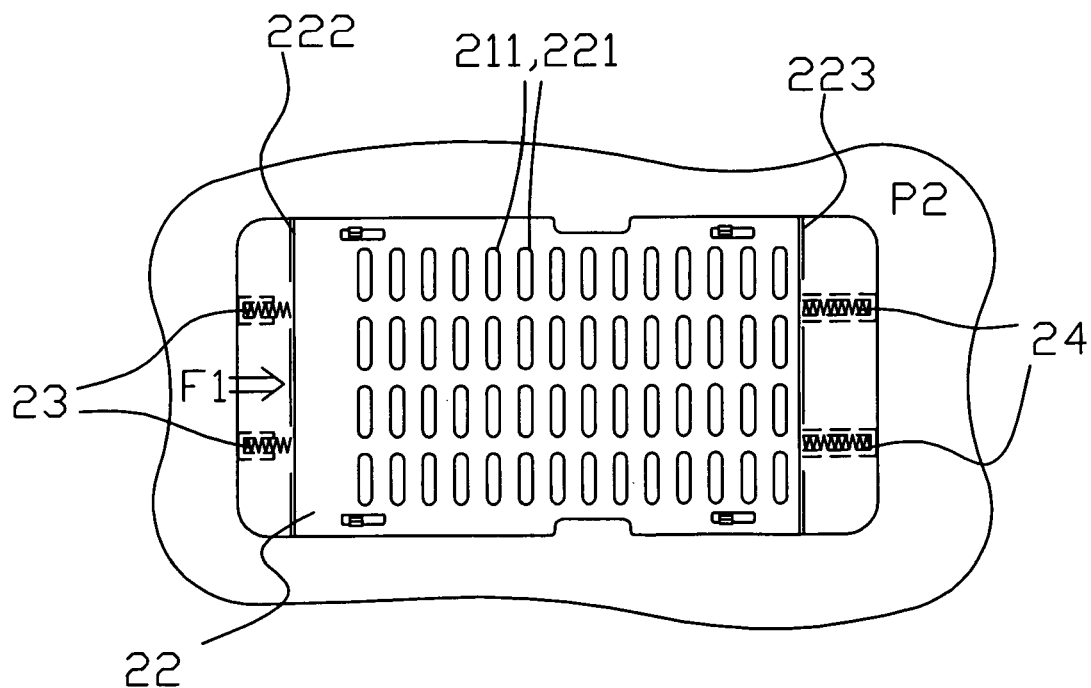
FIG. 5 is another partially schematic illustration showing the electrical apparatus and the shielding structure for the heat dissipation openings according to a preferred embodiment of the invention, wherein the shielding plate is positioned at a second position P2, and the first holes and the heat dissipation openings are aligned.

With reference to FIGS. 2 and 5, when the electrical apparatus 2 starts to operate and the environmental temperature in the housing 21 is higher than a predetermined temperature, such as 40 to 45° C., the first elastic element 23 made of the shape memory alloy is deformed due to the rise of the environmental temperature. That is, the first elastic element 23 is lengthened such that a first force F1 is applied to the first sidewall 222. Because the force exerted on the second elastic element 24 is greater than the elastic force of the second elastic element 24, the shielding plate 22 is moved to a second position P2, resulting in that the first hole 221 and the heat dissipation opening 211 are aligned. Therefore, the heat in the housing 21 can be dissipated with the convection through the heat dissipation opening 211 such that the quality of the electrical apparatus 2 is free from being deteriorated due to the overheated condition.

Figure 4:
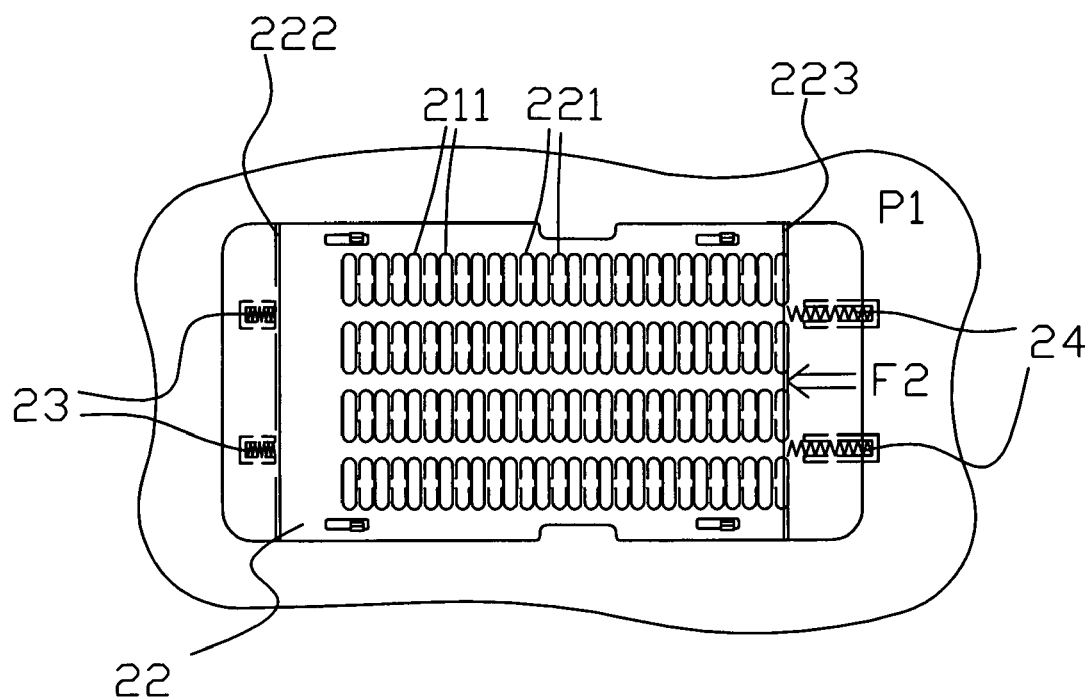
FIG. 4 is another partially schematic illustration showing the electrical apparatus and the shielding structure for the heat dissipation openings according to a preferred embodiment of the invention, wherein the shielding plate is positioned at a first position P1, and the first holes and the heat dissipation openings are misaligned.

Please refer to FIGS. 2 and 4. After the electrical apparatus 2 is used and no longer generates heat such that the environmental temperature of the housing 21 is lower than a predetermined temperature, the first elastic element 23 is shortened owing to the temperature decrease. At this time, the second elastic element 24 exerts a second force F2 (i.e., an elastic recovery force) on the second sidewall 223 so as to move the shielding plate 22 to a first position P1 such that the first hole 221 and the heat dissipation opening 211 are misaligned. In this embodiment, the predetermined temperature substantially ranges from 40 to 45° C. In such a case, because the first hole 221 and the heat dissipation opening 211 are misaligned, the heat dissipation opening 211 is shielded by the shielding plate 22. Therefore, particles and dust may be free from falling into the heat dissipation openings 211 and thus influence the quality of the electrical apparatus 2 after the electrical apparatus 2 is used.

Next, a shielding structure for heat dissipation openings according to the preferred embodiment will be described with reference to FIGS. 2 to 5.

In this case, the shielding plate 22, the first elastic element 23, and the second elastic element 24 of the electrical apparatus 2 constitute a shielding structure 20 for heat dissipation openings.

As shown in FIG. 2, the shielding structure 20 is for shielding at least one heat dissipation opening 211 of a housing 21 and includes a shielding plate 22, a first elastic element 23 and a second elastic element 24.

The housing 21 has at least one heat dissipation opening 211. In this embodiment, the housing 21 is a host housing for the electrical apparatus 2 and is formed with a plurality of heat dissipation openings 211. In addition, with reference to FIGS. 2 and 3, the housing 21 may further have at least one electrical element 25 and a cooling fan 26. The generated heat of the electrical element 25 can be brought away from the housing 21 via the cooling fan 26 and heat dissipation openings 211 to reduce the temperature of the electrical element 25.

Referring to FIG. 2 again, in this embodiment, the housing 21 further has a first groove 212 and a second groove 213. The first elastic element 23 is accommodated in the first groove 212, and the second elastic element 24 is accommodated in the second groove 213. At least one part of the first elastic element 23 or the second elastic element 24 contacts the housing 21.

The shielding plate 22 has at least one first hole 221, a first sidewall 222 and a second sidewall 223. The shielding plate 22 is disposed parallel to at least one part of the housing 21.

With reference to FIG. 2, the shielding plate 22 further has at least one second hole 224, and the housing 21 further has at least one constraining member 214 penetrating through the second hole 224. In this embodiment, the constraining member 214 is a hook, which can pass through the second hole 224 and hook the shielding plate 22 to prevent the shielding plate 22 from falling when the electrical apparatus 2 is moved.

Referring to FIG. 3, at least one part of the first elastic element 23 contacts the first sidewall 222, and the first elastic element 23 is made of a shape memory alloy, which is, for example, a shape memory alloy.

In this case, the material of the shape memory alloy of the first elastic element 23 may be the Cu—Zn alloy, Cu—Al—Mn alloy, Cu—Al—Ni alloy, Cu—Al—Be alloy, Cu—Al—Be—Zr alloy or Cu—Al—Ni—Be alloy. In this embodiment, the material of the first elastic element 23 is the Ni—Ti alloy as an example.

As shown in FIG. 3, the second elastic element 24 has at least one part in contact with the second sidewall 223. In this embodiment, the second elastic element 24 is a compression spring.

As shown in FIGS. 2 and 3, with pushing the first sidewall 222 and the second sidewall 223 by the first elastic element 23 and the second elastic element 24, the shielding plate 22 is caused to move between the first elastic element 23 and the second elastic element 24. Thus, the alignment and misalignment of the heat dissipation opening 211 and the first hole 221 can be controlled.

With reference to FIGS. 2 and 5, when the electrical apparatus 2 starts to operate and the environmental temperature in the housing 21 is higher than a predetermined temperature, such as 40 to 45° C., the first elastic element 23 made of the shape memory alloy is deformed due to the rise of the environmental temperature. That is, the first elastic element 23 is lengthened such that a first force F1 is applied to the first sidewall 222. Because the force exerted on the second elastic element 24 is greater than the elastic force of the second elastic element 24, the shielding plate 22 is moved to a second position P2, resulting in that the first hole 221 and the heat dissipation opening 211 are aligned. Therefore, the heat in the housing 21 can be dissipated with the convection through the heat dissipation opening 211 such that the quality of the electrical apparatus 2 is free from being deteriorated due to the overheated condition.

Please refer to FIGS. 2 and 4. After the electrical apparatus 2 is used and no longer generates heat such that the environmental temperature of the housing 21 is lower than a predetermined temperature, the first elastic element 23 is shortened owing to the temperature decrease. At this time, the second elastic element 24 exerts a second force F2 (i.e., an elastic recovery force) on the second sidewall 223 so as to move the shielding plate 22 to a first position P1 such that the first hole 221 and the heat dissipation opening 211 are misaligned. In this embodiment, the predetermined temperature substantially ranges from 40 to 45° C. In such a case, because the first hole 221 and the heat dissipation opening 211 are misaligned, the heat dissipation opening 211 is shielded by the shielding plate 22. Therefore, particles and dust may be free from falling into the heat dissipation openings 211 and thus influence the quality of the electrical apparatus 2 after the electrical apparatus 2 is used.

In summary, the electrical apparatus of the invention and its shielding structure for heat dissipation openings have a shielding plate, which moves between the first elastic element and the second elastic element to control the alignment of the heat dissipation opening with the first hole on the shielding plate when the first elastic element and the second elastic element push against the shielding plate. Compared to the prior art, the electrical apparatus of the invention and the shielding structure can use the first elastic element, which is made of the shape memory alloy, to exert a force on the shielding plate to align the heat dissipation opening with the first hole. Accordingly, the air in the housing can be exchanged for the external cooling air when the temperature inside the housing rises. When the temperature in the housing decreases (e.g., when the electrical apparatus is not used), the second elastic element exerts a force on the shielding plate such that the heat dissipation opening and the first hole are misaligned, and the heat dissipation opening is closed. Therefore, when the electrical apparatus is not used, particles or dust may be free from entering the housing via the heat dissipation opening. Thus, the quality of the electrical apparatus is free from being influenced, and the good heat dissipation efficiency of the electrical apparatus may be ensured.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A shielding structure for shielding at least one heat dissipation opening of a housing, the shielding structure comprising:

a shielding plate having at least one first hole, a first sidewall and a second sidewall, wherein the shielding plate is disposed parallel to at least one part of the housing, and the first hole and the heat dissipation opening are aligned when the shielding plate is moved;

a first elastic element having at least one part in contact with the first sidewall, wherein the first elastic element is made of a shape memory alloy;

a second elastic element having at least one part in contact with the second sidewall, wherein the shielding plate is movable between the first elastic element and the second elastic element;

wherein at least one part of the first elastic element or at least one part of the second elastic element contacts the housing; and wherein the housing further has a first groove and a second groove, the first elastic element is accommodated in the first groove, and the second elastic element is accommodated in the second groove.

2. The shielding structure according to claim 1, wherein the shielding plate further has at least one second hole, and the housing further has at least one constraining member penetrating through the second hole.

3. The shielding structure according to claim 2, wherein the constraining member is a hook.

4. The shielding structure according to claim 1, wherein the material of the shape memory alloy is at least one selected from the group consisting of a Cu—Zn alloy, a Cu—Al—Mn alloy, a Cu—Al—Ni alloy, a Cu—Al—Be alloy, a Cu—Al—Be—Zr alloy, a Ni—Ti alloy, and a Cu—Al—Ni—Be alloy.

5. The shielding structure according to claim 1, wherein the second elastic element is a compression spring.

6. The shielding structure according to claim 1, wherein when an environmental temperature is higher than a predetermined temperature, the first elastic element further applies a first force to the first sidewall such that the shielding plate is moved and the first hole and the heat dissipation opening are aligned.

7. The shielding structure according to claim 6, wherein when the environmental temperature is lower than the predetermined temperature, the second elastic element further applies a second force to the second sidewall such that the first hole and the heat dissipation opening are misaligned.

8. The shielding structure according to claim 6, wherein the predetermined temperature substantially ranges from 40 to 45° C.

9. An electrical apparatus, comprising:
a housing having at least one heat dissipation opening;
a shielding plate having at least one first hole, a first sidewall and a second sidewall, wherein the shielding plate is disposed parallel to at least one part of the housing, and the first hole and the heat dissipation opening are aligned when the shielding plate is moved;
a first elastic element having at least one part in contact with the first sidewall, wherein the first elastic element is made of a shape memory alloy; and
a second elastic element having at least one part in contact with the second sidewall, wherein the shielding plate is movable between the first elastic element and the second elastic element;
wherein at least one part of the first elastic element or at least one part of the second elastic element contacts the housing; and wherein the housing further has a first groove and a second groove, the first elastic element is accommodated in the first groove, and the second elastic element is accommodated in the second groove.

10. The electrical apparatus according to claim 9, wherein the shielding plate further has at least one second hole, and the housing further has at least one constraining member penetrating through the second hole.

11. The electrical apparatus according to claim 10, wherein the constraining member is a hook.

12. The electrical apparatus according to claim 9, wherein the material of the shape memory alloy is at least one selected from the group consisting of a Cu—Zn alloy, a Cu—Al—Mn alloy, a Cu—Al—Ni alloy, a Cu—Al—Be alloy, a Cu—Al—Be—Zr alloy, a Ni—Ti alloy, and a Cu—Al—Ni—Be alloy.

13. The electrical apparatus according to claim 9, wherein the second elastic element is a compression spring.

14. The electrical apparatus according to claim 9, wherein when an environmental temperature is higher than a predetermined temperature, the first elastic element further applies a first force to the first sidewall such that the shielding plate is moved and the first hole and the heat dissipation opening are aligned.

15. The electrical apparatus according to claim 14, wherein when the environmental temperature is lower than the predetermined temperature, the second elastic element further applies a second force to the second sidewall such that the first hole and the heat dissipation opening are misaligned.

16. The electrical apparatus according to claim 14, wherein the predetermined temperature substantially ranges from 40 to 45° C.

\* \* \* \* \*